United States Patent [19]

Pascal

[11] 4,066,152
[45] Jan. 3, 1978

[54] GRIPPER FOR A DISC BRAKE

[75] Inventor: Jean-Pierre Pascal, Paris, France

[73] Assignee: Fradisc, Gagny, France

[21] Appl. No.: 732,587

[22] Filed: Oct. 14, 1976

[30] Foreign Application Priority Data

Oct. 16, 1975 France ................... 75.31623

[51] Int. Cl.² ............................................. B60T 13/04
[52] U.S. Cl. .................................. 188/171; 188/71.9;
188/72.9; 188/196 BA; 192/70.29; 192/90
[58] Field of Search ..................... 188/71.9, 72.1, 72.3,
188/72.9, 170, 171, 196 BA, 59; 192/70.25,
70.29, 90, 111 A; 310/77

[56] References Cited

U.S. PATENT DOCUMENTS

| 1,894,565 | 1/1933 | Leonhauser | 188/196 BA |
| 3,190,399 | 6/1965 | Bowen et al. | 188/196 BA X |
| 3,520,386 | 7/1970 | Rogier | 188/72.9 X |
| 3,795,290 | 3/1974 | Hori et al. | 188/171 X |

FOREIGN PATENT DOCUMENTS

| 2,345,828 | 3/1975 | Germany | 188/71.9 |
| 30,070 | 7/1964 | Germany | 188/71.9 |
| 1,178,457 | 9/1964 | Germany | 188/171 |
| 50,068 | 8/1968 | Japan | 188/171 |
| 558,895 | 2/1975 | Switzerland | 188/59 |
| 9,671 of | 1902 | United Kingdom | 188/196 BA |

*Primary Examiner*—George E. A. Halvosa
*Attorney, Agent, or Firm*—Karl W. Flocks

[57] ABSTRACT

A disc brake keyed on a shaft has two levers and two gripping pads and comprises at least one spring whose action produces the tightening of the two pads on the disc. An electromagnet with a fixed yoke and movable armature produces the releasing of the two pads. A pivot assembly for the two levers is provided each comprising one end acting on one of the two pads and an opposite actuated end. The electromagnet is arranged between the actuated end of one of the levers and the actuated end of the other of the levers. The actuated ends have the form of a hollow body enveloping the electromagnet at least in part. The total lateral bulk of the gripper, in the direction parallel to the shaft bearing the disc is thereby kept less than the sum of the thicknesses of the two levers and of the electromagnet, the electromagnet thus remaining accessible. The device is notably useful in handling equipment.

4 Claims, 5 Drawing Figures

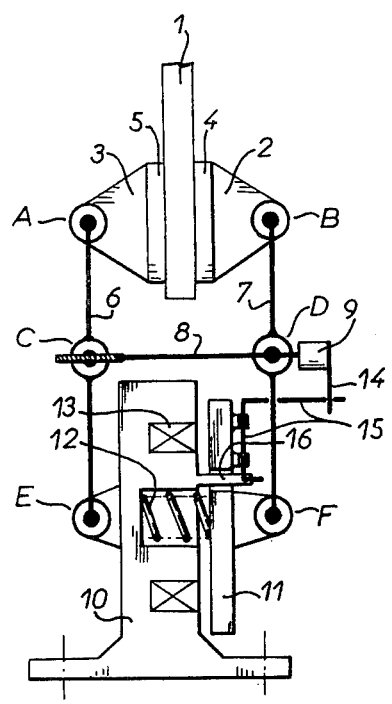
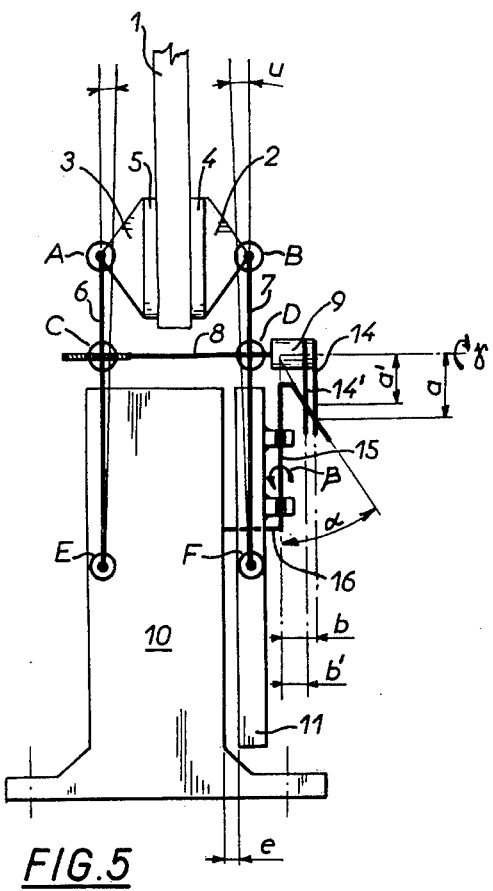
FIG.1    FIG.5
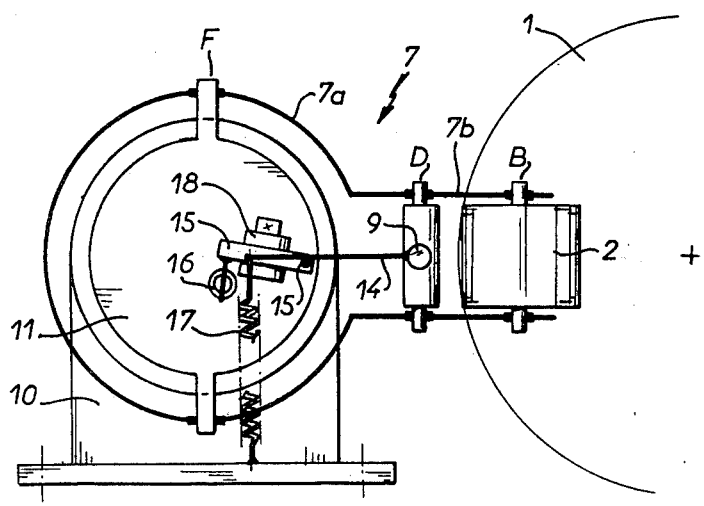
FIG.2

GRIPPER FOR A DISC BRAKE

BACKGROUND OF THE INVENTION

1. Field of the Invention

The present invention relates to grippers for disc brakes, notably for use on handling equipment such as travelling bridge cranes, in which the gripping of the disc by the pads is obtained by the action of the springs and the releasing by the electromagnet, the action of the springs and of the electromagnet being transmitted to said pads through two levers assembled with pivots in their middle region in the fashion of a laundry clip, in such a way that the springs acting to separate one end of the clip cause the gripping of the pads on the disc at the other end.

2. Description of the Prior Art

In known devices of this type, the springs are placed inside the electromagnet. The gripping forces necessary are large, several thousands of Newtons, and the specific force of the electromagnets being limited by the saturation of the iron at about 100 N per $cm^2$ of surface, said electromagnets have necessarily a large surface in the plane perpendicular to the forces. At the same time, it is necessary to keep a sufficient thickness at the electromagnet to guarantee a low enough stroke/spring length ratio and to ensure the housing of the coils; the electromagnet-springs assembly then has a considerable volume. In the known devices, said assembly is either placed outside of the levers, on the side — this increases the lateral bulk —, or above — this involves the complication of a second lever system —, or between the levers so that the total lateral bulk of the brake is large since it is represented by the cumulative thicknesses of the two levers (which is large since they must withstand bending) and of the thickness of said assembly.

Now the disc on which these grippers act is mostly mounted on a stub shaft projecting from a reducer.

To avoid causing this shaft to operate under large flexion-torsion stresses during braking, the overhang of the disc is reduced to the minimum so that the space available between the housing of the reducer and the plane of the disc is limited. For this reason, only brakes whose electromagnet assembly is on one side of the levers have been able to be developed: said assembly is then placed on the opposite side to the reducer, generally facing a coupling; this arrangement has resulted in the grippers situated on one side or the other of the disc not being identical, so that a "right" and a "left" exist, which constitutes a difficulty in the manufacture of brakes and the maintenance of the machines.

OBJECTS AND GENERAL DESCRIPTION OF THE INVENTION

It is a particular object of the present invention to provide a device of the type described above whose lateral bulk is small and compatible with the spaces available between a disc and a housing and moreover, symmetrical so that it is immaterial whether the gripper is mounted on one side of the disc or the other.

Another object of the invention is to provide a pad-wear take-up device, automatically actuated, in combination with the gripper device.

Other objects and advantages of the disc brake gripper according to the invention will become apparent from the description which follows.

In the grippers according to the invention, the electromagnet-springs assembly is arranged between the ends of the levers opposite the pads, said ends having the form of a hollow body, for example of a tube, enveloping said assembly so that the total lateral bulk of the gripper is less than the sum of the thicknesses of the levers and of said assembly. In addition, the pivots assembly element of the two levers is constituted, in manner known in itself, by a spindle threaded at one end, adapted to be screwed into a nut fast to one of said pivots under the action of a commercial ratchet wrench fixed at the other end which is also axially fast to the second pivot, the angular movement of the arm of the wrench being linked to the movement of the armature of the electromagent-springs assembly through an angle bracket turning in a bearing fast to the armature. In this way, the play between the pads of the disc is kept constant as well as the play between the armature and the yoke of the electromagnet by means of a very simple device applying commerically mass-produced parts. The whole of this automatic wear take-up device is situated inside the hollow levers which protect it from shocks and it does not increase the lateral bulk of the gripper. The play can be adjusted by regulating the working point of a counter-lever on an arm of the wrench. Commerical ratchet wrenches include a two position bolt: the spindle is driven positively in one or other direction according to the position of the bolt. Thus, in "tightening" position, the pawl screws the spindle into the nut and brings the pads of the disc together, this is the automatic operating position; in the "releasing" position the wrench unscrews the spindle under the action of an operator to change the pads, for example. The device ensures that in the case of error of position of the nut, the movement of the armature cannot unscrew the spindle; the wrench is restored in this direction only by a weak spring.

BRIEF DESCRIPTION OF THE DRAWINGS

The invention will be better understood by means of the description which follows of preferred embodiments, given purely by way of non-limiting example, with reference to the accompanying drawings, in which:

FIG. 1 is a diagrammatic view of a gripper according to the invention showing the operation of the automatic wear take-up feature according to the invention;

FIG. 2 is a diagrammatic view in elevation of a gripper according to the invention showing the general arrangement of the hollow levers and of the wear take-up device;

FIG. 5 is another diagrammatic view of a gripper according to the invention.

DESCRIPTION OF PREFERRED EMBODIMENTS

Figure 3:
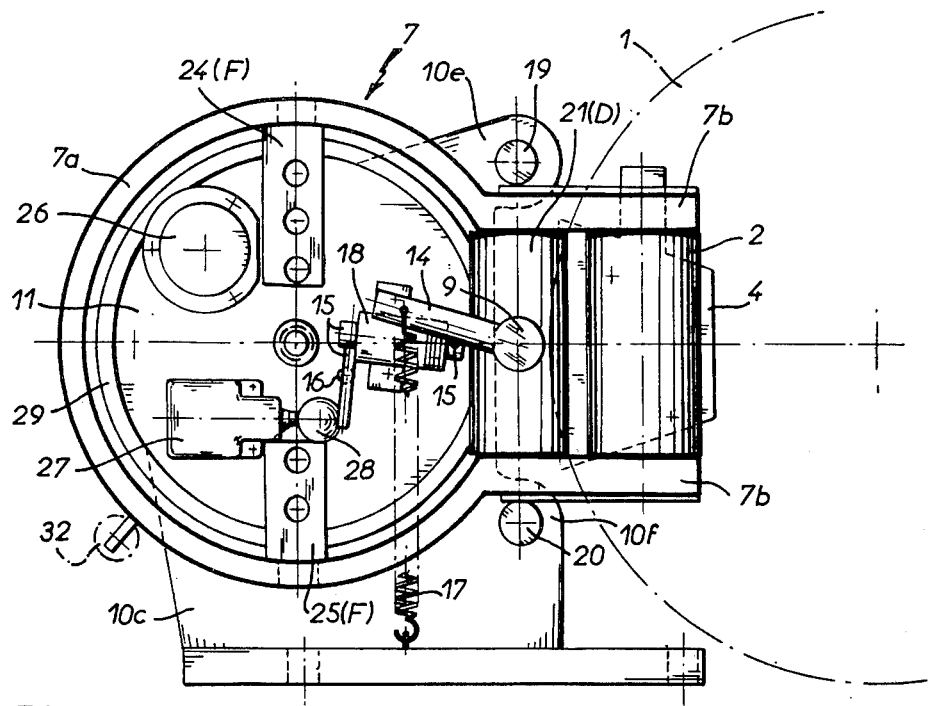
FIG. 3 shows a view in elevation of one embodiment of a gripper according to the invention.

In FIGS. 1 and 2, in which for clarity of the drawing FIG. 1 only shows the operational features of the gripper and avoids the covering of the members, the disc 1 to be braked is arranged between pads 4 and 5 whose supports 2 and 3 are linked to levers 6 and 7 through articulations A and B. A threaded spindle 8, connecting the pivots C and D of the levers 6 and 7, is drivable by a ratchet wrench 9 bearing an actuating arm 14. The yoke 10 of an electromagnet is fixed to the base plate of the machine and the armature 11 of this electromagnet is connected to the lever 7 through an articulation F. The lever 6 is connected to the base plate through an articulation E. The brake spring 12 is housed in the yoke 10 and tends to separate the articulations E and F and to bring together A and B by pivoting around C and D. The electric winding 13 can be energised by a DC source (not shown) and thus energise the electromagnet whose armature is attracted by the yoke, counteracting the effect of the spring 12, causing the air gap of the electromagnet visible in FIG. 1 to disappear, to create a play between the pads 4, 5 and the disc 1. By this movement, the armature 11 communicates to a counter-lever 15 which turns in a bearing 18 fast to the armature and which abuts at one of its ends against a fixed stop 16, an angular movement such that the end of the counter-lever 15 engaged under an arm 14 lifts upwards, driving the arm 14 and causing the rotation of the pawl 9 in clockwise direction by an amount proportional to the stroke of the armature. When during braking sufficient wear of the pads is produced for the stroke of the armature to correspond with the angle of one tooth of the pawl device, the wrench drives the spindle 8 whose threading is calculated to take up the corresponding excess wear. It should be noted that the take-up is caused by the action of the electromagnet in a positive manner and at the moment when the spindle 8 is no longer subject to the forces of the spring 12. The spring 17 restores the arm 14 back but is not sufficiently strong to drive the spindle 8 in the case where the bolt of the pawl device would have remained by error in incorrect position.

The levers 6 and 7 are identical and, in the embodiment of FIG. 2 they each comprise a tubular or hollow portion constituting the end (6a or 7a) opposite the pad and two rings, lateral to the tubular portion, constituting the end (6b or 7b) acting on the pad. The tubular ends of the levers envelop at least in part the electromagnet (yoke and armature) so that the total bulk of the gripper, in the direction parallel to the shaft carrying the disc is less than the sum of the thicknesses of the levers 6 and 7 and of the electromagnet and so that the central portions of the electromagnet are accessible.

Figure 4:
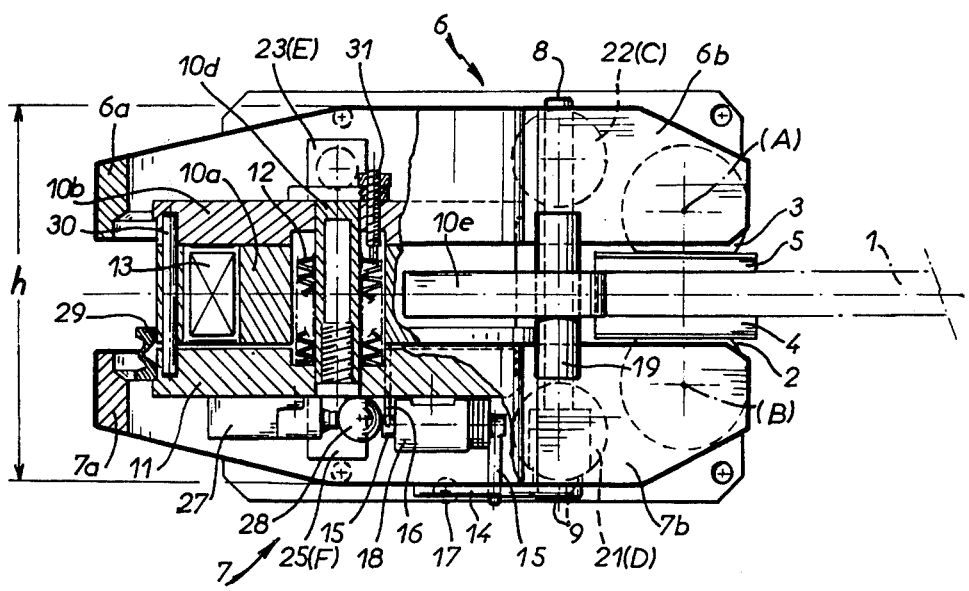
FIG. 4 shows a view from above, cut partly along the horizontal diameter of the electromagnet, of the embodiment of FIG. 3.

This feature of the invention appears better still in the embodiment of FIGS. 3 and 4 in which the bulk is indicated by (h) and whose operation is identical with that described above. It will be noted that for manufacturing reasons, the fixed parts 10 are constituted by several parts rigidly assembled together: 10a is the core of the electromagnet, 10b is the yoke, 10c is the support bracket of the gripper assembled by welding on the middle outer part of the electromagnet and bearing two lugs 10e and 10f which receive respectively the stop shafts 19 and 20 readjusting the tangential braking reaction forces transmitted to the levers 6 and 7 by the pads supports 3 and 2 which themselves receive them from the pads 5 and 4 through fastenings (not shown). The reaction force not passing through the stops 19 and 20, there remains a moment applied to the levers, and this moment is transmitted, for the lever 6 through the articulation E of which the section of FIG. 4 shows the lower part 23 fixed to the yoke 10b itself fixed, and for the lever 7 through the articulation F composed of the parts 24 and 25 fixed to the armature 11 which is stopped in rotation by the fixed pin 30. The pivot part 22, tapped to form a nut and to receive the threaded spindle 8, constitutes the pivot C, and the pivot 21, faced to receive the head of the stop of the spindle 8 and the ratchet wrench 9, constitutes the pivot D. The spindle 8 may be constituted by a screw whose head serves as a stop and is made fast to the wrench by a commercial bush. A breather bladder 26, fixed to the armature 11 communicating with the inside of the electromagnet, enables the movements without placing the interior under suction and avoids the ingress of dust. A flexible air-gap seal 29 is provided and an electrical contact 27 under a fluid-tight commercial casing is designed to transmit, to a distance, information on the state of gripping or of releasing of the brake. It is actuated by the counter-lever 15 through a ball 28. Three screws 31 enable adjustment of the compressed length of the spring 12, constituted by cup washers, to adjust the gripping torque of the brake. A return spring 32 is designed to keep a slight grip on the spindle 8 in releasing position, to avoid inadvertent screwing by vibration.

A fixed cylinder 10d serves for centering the springs and is internally tapped to receive a screw for the manual withdrawal of the gripper, used for changing pads.

In FIG. 5, the closing movement of the levers 6 and 7 corresponding to the total wear of the pads 4 and 5 has been shown diagrammatically by a fine line and the corresponding angle of rotation around the pivot F has been marked $u$. After this wear the arm of the wrench comes into the position 14' and hence approaches the armature 11. The distance from the arm 14 to the axis of rotation of the central portion of the counter-lever 15 then passes from the value $b$ to the value $b'$ and it is necessary, according to the invention, to adjust the angle $\alpha$ which the portion of the counter-lever 15 in engagement with the arm 14, makes with the central turning portion of the counter-lever 15, so that the relationship which connects the air-gap $e$ with the rotation $\gamma$ of the pawl device is not disturbed by variations of $u$. In fact, if $f$ is the fixed distance (perpendicular to the plane of the Figure) between the axis of 15 and the stop 16, the rotation $\beta$ of the counter-lever 15 is connected with $e$ by the relationship: $\beta = e/f$ (all the angles being small, they are similar to their tangent; in the same way it is seen that $\gamma = \beta \, b/a = (e/f) \cdot (b/a)$, since $f$ is fixed, it is necessary that the ratio $b/a$ remains constant whatever $u$ may be in order that the relationship between $\gamma$ and $e$ may be constant. Now this cannot be realised if $\alpha$ is close to 90°; on the other hand if $\alpha$ is less than 90° and if the directions of the spindle 8, of the central portion or axis of rotation of the counter-lever 15 and of the portion of the counter-lever 15 in engagement with the arm 14, are substantially concurrent, we have:

$$\tan \alpha = b/a = \text{Constant} = b'/a'.$$

If N is the number of teeth of the pawl device, we have:

$$\gamma = 2\pi/N = (e/f) \cdot \tan \alpha$$

or $$e = (2\pi \cdot f)/(N \cdot \tan \alpha)$$

This relationship determines the operating air-gap of the electromagnet which can hence be adjusted by the value of $\alpha$ and remains constant if the lever 7 is brought to pivot around the pivot F, as a result of wear of the pads or consequent upon axial displacement of the disc 1.

I claim:

1. A gripper for a disc brake having a disc keyed on a shaft, notably for use in handling equipment, comprising two gripping pads located for gripping the disc, two levers with one of each of said levers connected to one of said gripping pads, spring means to produce the gripping of said two pads on the disc, electromagnetic means having a fixed yoke and a movable armature to produce the releasing of said pads from the disc by opposing said spring means, each of said levers having a pivot assembly, each of said assemblies including one end of each of said levers connected to act on one of said pads, an opposite end of each of said levers being an actuated end, said electromagnetic means arranged between said actuated ends and said levers having the form of a hollow body enveloping said electromagnetic means, adjusting means having a substantial portion thereof received within the confines of said hollow body form of said levers.

the gripper having a total lateral bulk in the direction parallel to the shaft carrying the disc of less than the sum of the thicknesses of said two levers and of said electromagnetic means, said adjusting means including a torque arm, a rachet wrench connected for angular movmement actuated by said torque arm, a bearing connected fast to said movable armature, a fixed part forming a stop, a counter-lever having a portion mounted for turning in said bearing and another portion for engagement with said torque arm and for abutting against said fixed part, a nut fixed to one of said pivot assemblies, a spindle having a threaded end portion engaged with said nut and a head end at the other of said pivot assemblies fixedly connected to said rachet wrench, rotation of said spindle to tighten said threaded end portion of said spindle in said nut causing tightening of the gripper about the disc.

2. A gripper according to claim 1 wherein said spring means is arranged between said fixed yoke and said movable armature of said electromagnetic means.

3. A gripper according to claim 1 wherein said portion of said counter-lever in engagement with said torque arm forming with said portion of said counter-lever turning in said bearing, an angle less than 90°, and the direction of said portions of said counter-lever and the direction of said spindle being concurrent at the same point.

4. Gripper according to claim 1, wherein said two levers are identical and each comprise a tubular portion constituting said actuated end, and at least one wing, lateral to said tubular portion, constituting said end acting on one of said two pads.

* * * * *